Figure 1:
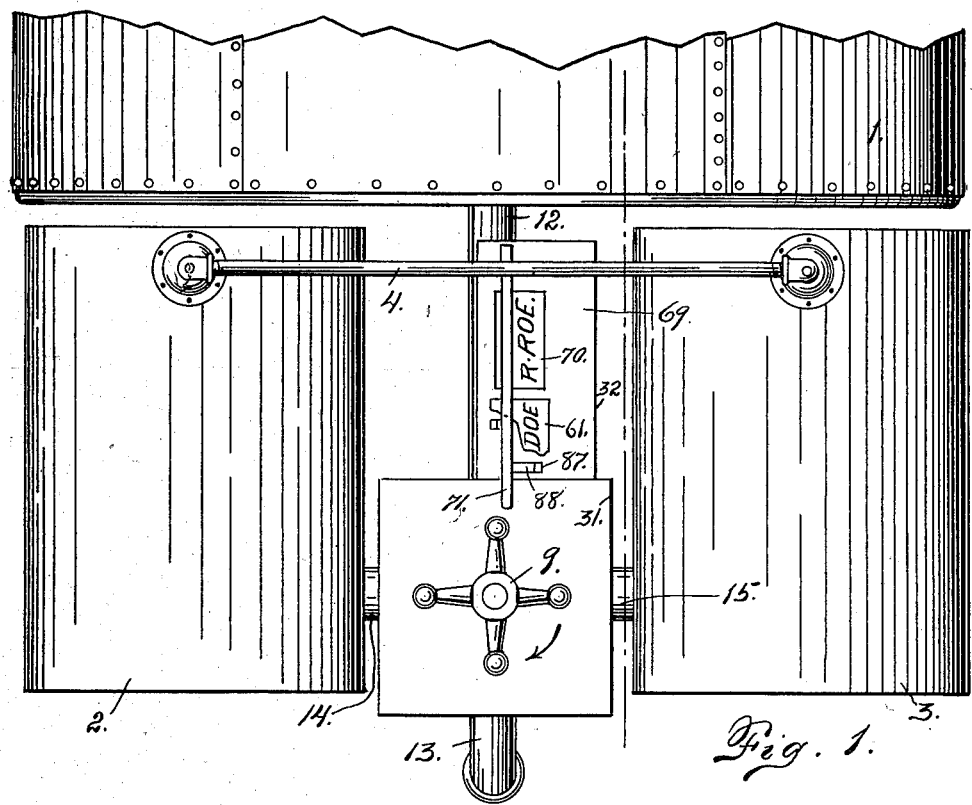

No. 731,644. PATENTED JUNE 23, 1903.
J. G. WILLIAMS.
MEASURING AND REGISTERING DEVICE FOR LIQUID SUPPLY TANKS.
APPLICATION FILED MAY 16, 1901.
NO MODEL. 4 SHEETS—SHEET 1.

Witnesses:
W. F. Schifla
W. F. Pfaff

Inventor:
Joseph G. Williams
By W. F. Miller
Attorney

No. 731,644. PATENTED JUNE 23, 1903.
J. G. WILLIAMS.
MEASURING AND REGISTERING DEVICE FOR LIQUID SUPPLY TANKS.
APPLICATION FILED MAY 16, 1901.
NO MODEL. 4 SHEETS—SHEET 2.
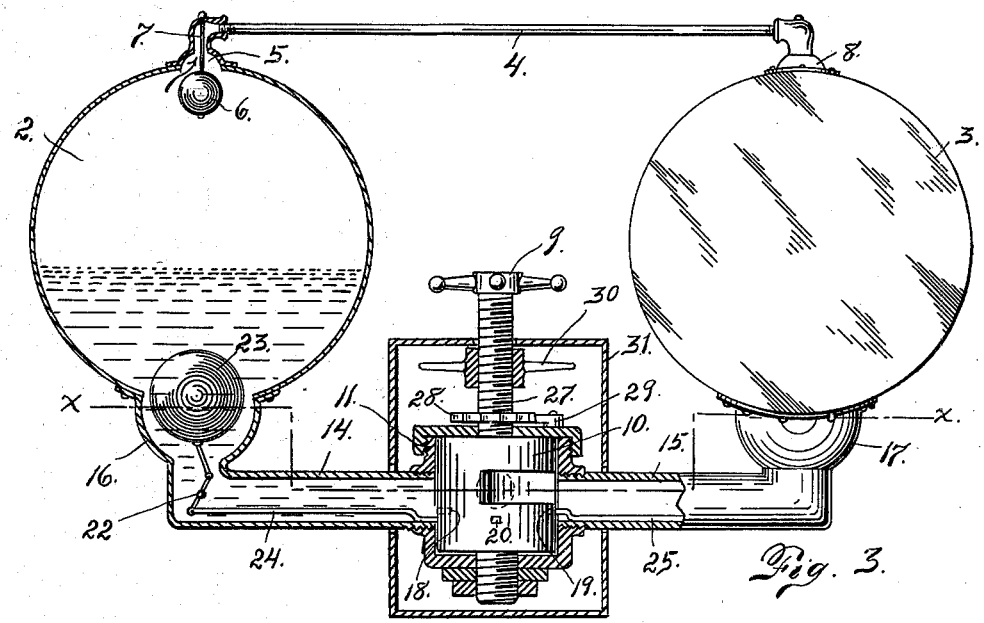
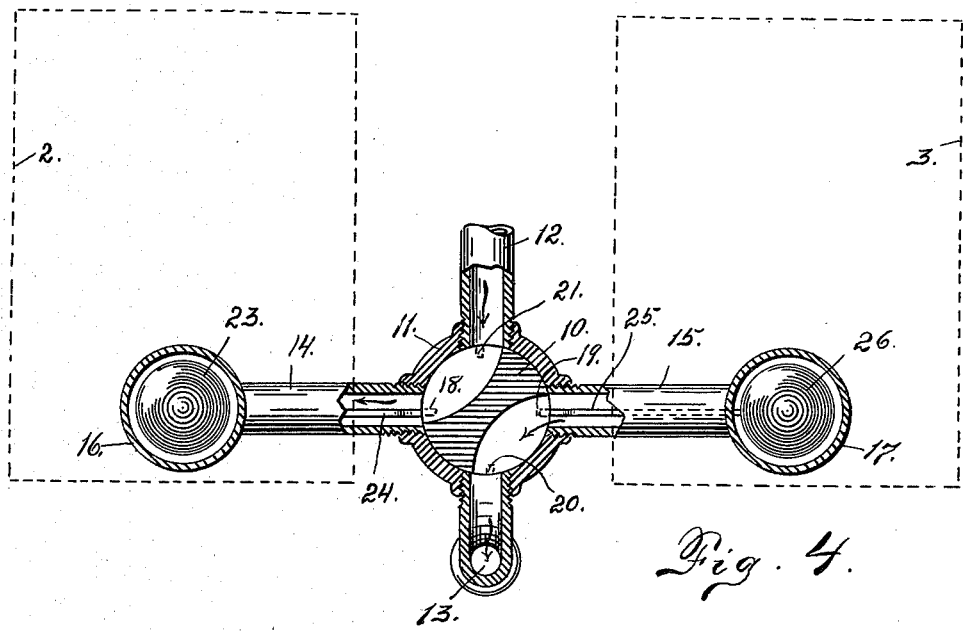
Witnesses:
W. F. Schifla
W. F. Pfaff
Inventor
Joseph G. Williams
By W. F. Miller
Attorney No. 731,644. PATENTED JUNE 23, 1903.
J. G. WILLIAMS.
MEASURING AND REGISTERING DEVICE FOR LIQUID SUPPLY TANKS.
APPLICATION FILED MAY 16, 1901.
NO MODEL. 4 SHEETS—SHEET 3.

Witnesses:
W. F. Schifla
W. F. Pfaff

Inventor.
Joseph G. Williams
By W. T. Miller
Attorney.

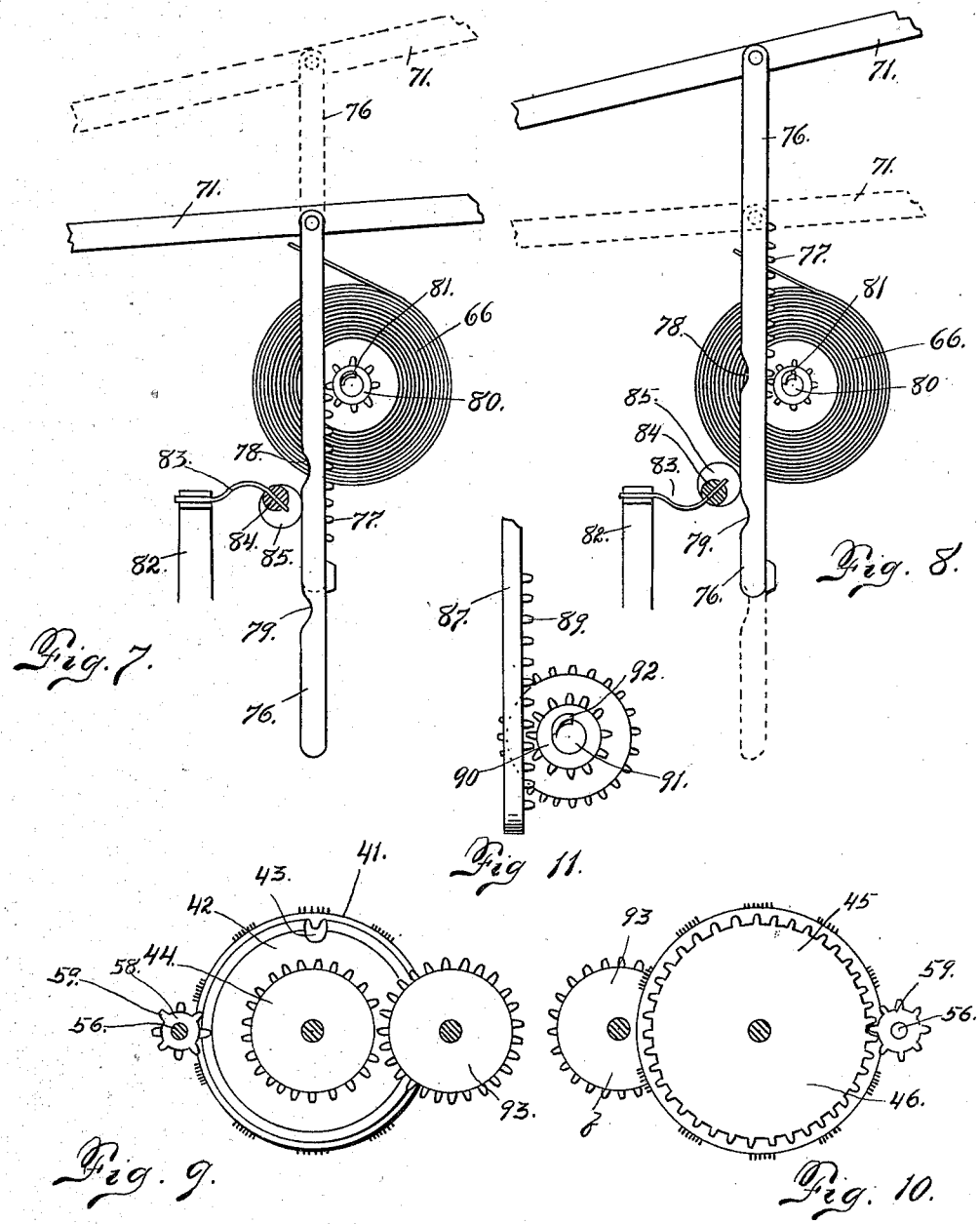

No. 731,644.

Patented June 23, 1903.

UNITED STATES PATENT OFFICE.

JOSEPH G. WILLIAMS, OF BUFFALO, NEW YORK.

MEASURING AND REGISTERING DEVICE FOR LIQUID-SUPPLY TANKS.

SPECIFICATION forming part of Letters Patent No. 731,644, dated June 23, 1903.

Application filed May 16, 1901. Serial No. 60,523. (No model.)

*To all whom it may concern:*

Be it known that I, JOSEPH G. WILLIAMS, a citizen of the United States, residing at Buffalo, in the county of Erie and State of New York, have invented certain new and useful Improvements in Measuring and Registering Devices for Liquid-Supply Tanks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in that class of devices which are intended to be attached to and operate with tanks containing oil or other liquids to measure and register the quantity of liquid drawn off.

The object of my invention is principally to safeguard the retail trade in oil, both for the buyer and seller—in other words, to insure the delivery to the buyer of the full and accurate measure called for and to accurately register and record for the benefit of the buyer and seller the actual quantity delivered.

To these ends my invention consists of a supply-tank, either stationary or portable, twin measuring vessels communicating both with the supply-tank and with a handle provided with a two-way valve to effect the alternate emptying and filling of the twin measuring vessels, a fluid-actuated lock operating with the handle to prevent the further turning of the same until the measuring vessel is emptied, a register device operated by the handle, two strips for simultaneously receiving the register, one being fed out of the casing and the other being retained therein as a record, and mechanism for transferring the register to the strips, for feeding the same forward, and for restoring the registering mechanism to its proper operative position.

My invention further consists of certain details of construction, all of which will be fully hereinafter described, and pointed out in the claims.

I will now proceed to minutely describe the manner in which I have carried out my invention.

Figure 2:
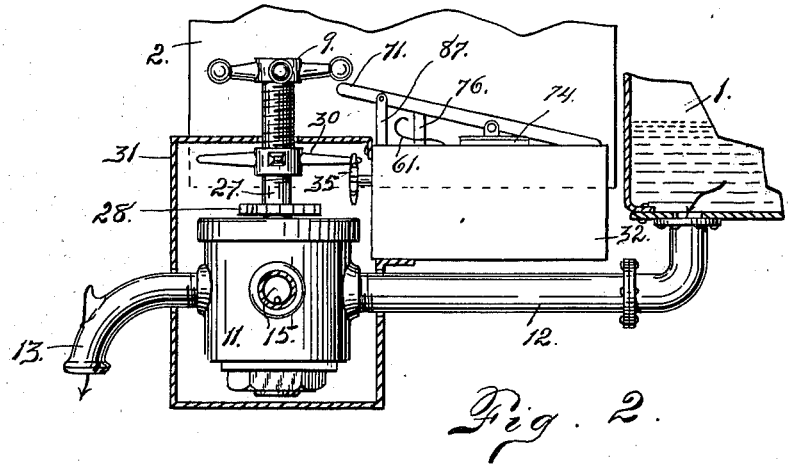
Figure 5:
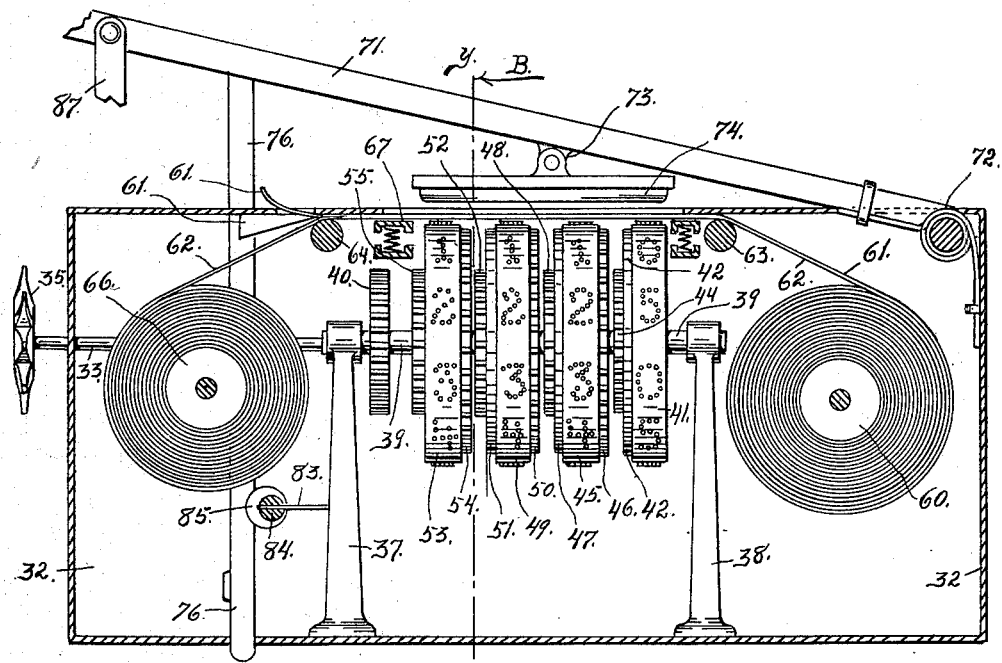
Figure 6:
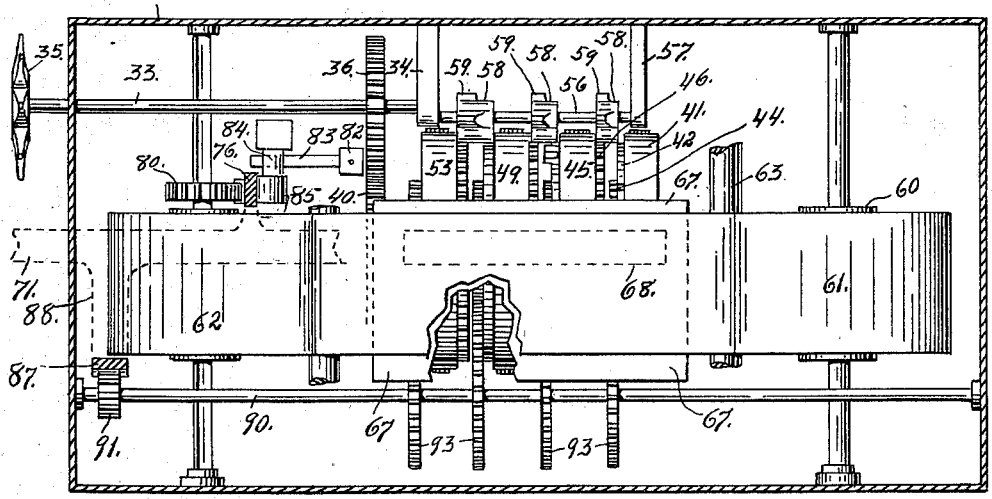

In the drawings, Figure 1 is a top plan view of a fragmentary portion of the supply-tank with my improved device attached. Fig. 2 is a side elevation of the handle and attachments with fragmentary portions of the supply-tank and of one of the measuring vessels. Fig. 3 is an enlarged end elevation of my improved device with portions shown in section. Fig. 4 is a horizontal section taken in the line $xx$ of Fig. 3. Fig. 5 is a side elevation, partly in section, of the registering and recording mechanism and operative attachments. Fig. 6 is a top plan view of Fig. 5 with the cover of the casing and a portion of the operative mechanism removed. Figs. 7 and 8 are enlarged detached detail views of portions of the mechanism for feeding the strips. Fig. 9 is a vertical section taken in the line $yy$ of Fig. 5 looking in the direction of the arrow A. Fig. 10 is a vertical section taken in the same line $yy$ looking in the direction of the arrow B, and Fig. 11 is a detached detail of a portion of the mechanism for restoring the registering mechanism to its normal position.

Referring to the drawings, 1 is the supply-tank, which may be either stationary or portable.

2 and 3 are the twin measuring vessels, preferably holding five gallons of oil or other liquid and suitably mounted on the supply-tank.

4 is the communicating air-passage between the twin measuring vessels.

5 is a valve-seat in the measuring vessel 2 at the point where the air-passage 4 enters.

6 is the float-valve secured to the valve-rod 7. A similar valve is arranged in the other measuring vessel 3, of which 8 is the valve-seat. The valve 6 in its lowest position, as shown in Fig. 3, permits the air to escape through air-passage 4 into the other measuring vessel 3 as the liquid rises in the measuring vessel 2 to fill the same. When the liquid rises to the top of the vessel, the float-valve 6 is forced up against its seat and prevents the liquid from passing over into the opposite vessel 3. When the vessel 2 is emptied, the operation is reversed and the air is shifted from the vessel 3 back into the vessel 2.

9 is the handle carrying the two-way valve 10 within the casing 11. The feed-pipe 12 extends from the supply-tank 1 into the rear side of the valve-casing 11. On the opposite side of such casing is the spout 13. The emptying and filling pipes 14 and 15 are seated in the sides of the valve-casing 11 and lead to and communicate with the chambers 16 and 17 on the under sides of the measuring vessels 2 and 3.

The fluid-actuated lock, which operates with the handle to prevent the further turning of the same until the measuring vessel is emptied, is arranged as follows: In the valve 10 are arranged four sockets, the two opposite ones, 18 and 19, being in a slightly-higher plane than the two other opposite sockets 20 and 21, as clearly shown in Fig. 3. A double lever 22 is pivoted in the pipe 14. Upon its upper arm is pivoted the float 23 and upon its lower arm is pivoted the rod 24. On the opposite side is arranged in a similar manner the rod 25, operated by the float 26 through the intervention of a double lever. (Not shown.) This constitutes the fluid-actuated lock, which operates in the following manner: The vessel 3 is being emptied and until the vessel is entirely emptied the float 26 remains in its highest position. This has the effect of keeping the inner side of the rod 25 in engagement with its socket 19 until the liquid has entirely run out. The falling of the float 26 will then draw the rod 25 out of its socket 19 and release the valve, thus permitting the handle 9 to be turned one-quarter of a revolution to discharge the liquid from the now filled vessel 2. The float 23 is exerting an inward pressure on the rod 24, and when the socket 20 in the quarter-turn of the handle reaches the rod 24 its inner end, which is in the same plane as the socket 20, is thereby forced into engagement with such socket and serves to again lock the handle until such time as the liquid has been entirely discharged from the vessel 2.

Upon the shank 27 of the faucet 9 is rigidly mounted the spur-wheel 28, which engages in negative rotation with the spring-dog 29 (see Fig. 3) to prevent the backward turning of the handle.

30 is a four-pronged star-wheel adjustably mounted on the shank 27 of the faucet. A casing 31 incloses this wheel, the valve-casing 11 of the faucet, and the spur-wheel 28 and its dog 29.

32 is a casing in the rear of the casing 1 and incloses the registering mechanism and attachments. Within this casing is the shaft 33, one end of which is journaled in the bracket 34, its other end passing through the wall of the casing 32 and into the adjoining casing 31 and carrying upon its projecting end the ten-toothed spur-wheel 35, adapted for operative engagement with the star-wheel 30 on the shank 27 of the handle.

36 is a gear-wheel rigidly mounted on the shaft 33.

In the standards 37 and 38 is journaled the shaft 39. Upon this shaft 39 and adjacent to the standard 37 is rigidly mounted the gear-wheel 40, which intermeshes with the gear-wheel 36 on the shaft 33. On the shaft 39 and adjacent to the standard 38 is mounted the wheel 41, having alternately arranged upon its periphery the registering-figures "0" and "5." On the left face of wheel 41 and integral therewith is the concentric wheel 42, having the single groove 43 in its periphery, and on the face of the wheel 42 and integral therewith is the cog-wheel 44, it being a twenty-four-toothed wheel with two adjacent teeth removed. Next on the shaft 39 is the wheel 45, having on its periphery the registering-figures from "0" to "9" and having on its right face and integral therewith the cog-wheel 46 and on its left face the wheels 47 and 48, similar to the wheels 42 and 44 on the wheel 41. Next on the shaft 29 is the wheel 49, with registering-figures from "0" to "9" on its periphery, and wheels 50, 51, and 52, similar to wheels 46, 47, and 48, on wheel 45. The fourth and last wheel 53 also has the registering-figures from "0" to "9" and on its right face the wheel 54, similar to wheel 50, and on its left face the cog-wheel 55, similar to 52. The registering-figures on these wheels consist of a series of penetrating points. The registering-wheels are so mounted on the shaft 39 that when such shaft is revolved in positive rotation the wheels will turn therewith and when the shaft is stationary these wheels are capable of revolution in the opposite direction. The shaft 56 (see Fig. 6) is rigidly mounted in the brackets 34 and 57.

On the shaft 56 are loosely mounted the three integral double cog-wheels, each consisting of the right-hand wheel 58 with four cogs and the left-hand wheel 59 with eight cogs. The first cog-wheel 58 at the right engages with the single groove 43 in the wheel 42, and the cog-wheel 59 intermeshes with the cog-wheel 46. A similar engagement exists with the other two double cog-wheels.

60 is a roller mounted in the casing 32, upon which is wound two strips of paper 61 62, which pass over the guides 63 and 64 and are separated by the wedge-shaped piece 65, which directs the upper strip 61 out of the casing and the lower strip 62 down into and around the roller 66 within the casing, where it is kept as a record. Between the guides 63 and 64 and underneath the strips 61 and 62 is arranged the rigid plate 67, having the longitudinal opening 68, which exposes the upper row of figures on the registering-wheels 41, 45, 49, and 53. On the cover 69 of the casing 32 is cut the opening 70, (see Fig. 1,) which gives access to the strips 61 and 62 to enable upper strip 61 to be written on, and the under surface of the strip 61 being carbonized enables the writing on such strip to be transferred to the under strip 62, to be kept as a record upon the roller 66 inside the casing 32.

71 is a lever pivoted in the rear of the casing 32, (see Fig. 5,) and 72 is a spring exerting an upward pressure upon such lever. Pivoted to the lug 73 on the under side of this lever is the pad-press 74, of a size to be readily forced down through the opening 68 on the plate 67 and press the two strips 61 and 62 upon the points of the registering-figures below such opening.

The mechanism for feeding the strips forward is operated by the lever 71 as follows: 76 is a bar pivoted to the lever 71 and extending down into the casing 32. On one side are arranged the teeth 77 (see Figs. 7 and 8) and on the other side are the grooves 78 and 79. On the roller 66 is loosely mounted the pinion 80, provided with the spring-dog 81. This pinion engages with the teeth 77 on the bar 76.

82 is a post carrying a spring 83 at its upper end. Upon the outer end of this spring is the cylindrical holder 84, around which is loosely secured the cam 85. Now as the lever 71 is depressed the bar 76 is forced down and the teeth 77 cause the pinion 80 to revolve loosely without turning the roller 66. The spring-cam 81, bearing against the bar 76, does not interfere with the downward travel of such bar; but should an attempt be made to raise the bar before its full downward travel the cam 85 binds against the bar and stops its upward movement. When, however, the cam 85 has reached and entered the upper groove 78, which is the lower limit of the downstroke, it can turn in such groove, when the bar 76 is free to rise, as shown in Fig. 8. As the bar rises the dog 81 of the pinion 80 engages the roller 66, and the teeth 77 on the bar 76 then causes the pinion 80, and with it the roller 66, to revolve and feed the strips 60 and 61 forward the proper distance, the strip 62 being wound upon the roller 66, as shown in Fig. 5. In the upward travel of the bar 76 (see Fig. 8) the cam 85 operates to prevent the bar from being forced down until it has reached its full upward stroke, in the same manner as described in connection with the operation illustrated in Fig. 7.

The device for restoring the registering mechanism to its normal position is also operated by the lever 71 and is arranged and operates as follows: 87 (see Figs. 1, 5, 6, and 11) is a bar pivoted to an offset 88, extending out from the lever 71, and it extends down into the casing 32. It is provided with the teeth 89. (See Fig. 11.) 90 is a shaft (see Fig. 6) upon which is mounted loosely the pinion 91, carrying the spring-dog 92. Upon the shaft 90 is also rigidly mounted the cog-wheels 93, four in number and adapted to intermesh with the cog-wheels 44, 48, 52, and 55 upon the shaft 39. The operation of this mechanism is as follows: When the lever 71 is pushed down, the teeth 89 on the bar 87 will turn the spur-wheel 91 without revolving the shaft; but when the bar 87 rises in its upstroke the dog 92 engages the shaft and revolves the same, and with it the cog-wheels 93. These cog-wheels 93 in turn revolve the cog-wheels 44, 48, 52, and 55, each of which has a blank space in their periphery where the two teeth have been removed, as clearly shown in Fig. 9. When this blank space on each of these wheels has reached the cog-wheels 93, it throws them out of engagement and they remain stationary. As these wheels 44, 48, 52, and 55 are integral with the registering-wheels, the action above described results in restoring the registering-wheels to their normal position, ready for the next action of the faucet. In other words, when the blank spaces in the wheels 44, 48, 52, and 55 reach the cog-wheels 93 and their revolution is thereby stopped the zeros on the registering-wheels all appear in line through the opening 68, and the registering-wheels are thereby restored to their normal position.

The operation of my improved mechanism hereinbefore described is as follows: The supply-tank contains, for example, five hundred gallons, and the measuring vessels have a capacity of five gallons each, thus fixing the amount to be drawn off each time at five gallons. When the supply-tank is filled, the liquid immediately flows into and fills one of the measuring vessels, the faucet being closed. On turning the handle a quarter-revolution the two-way valve permits the liquid in the filled measuring vessel to escape through the outlet. At the same time the empty measuring vessel is thrown into communication with the supply-tank and commences to fill, the filling of this vessel being accomplished during the emptying of the other vessel. The handle is locked by means of the engagement of the rod 25 with the valve at the instant that the handle is opened for the discharge of the liquid and remains locked until the liquid is entirely discharged, the dropping of the float in such vessel 3 releasing the valve, which permits the handle to be turned another quarter-revolution to discharge the contents of the now-filled opposite vessel, the rod 24 in the meantime again locking the handle. This provision effectually prevents the delivery to the consumer of either more or less than five gallons at any one time. The turning of the handle a quarter-revolution causes the engagement of the attached star-wheel 30 with the ten-toothed cog-wheel 35, mounted on the shaft 33. This operates, as has already been described, to record on the registering-wheels the delivery of the first five gallons. The next operation is the depression of the lever 71 for effecting the three remaining operations of my improved mechanism—that of first transferring the register to the strips; second, feeding the strips forward, and third, restoring the registering mechanism to its normal position. Before operating the lever 71 the proper name and address of the buyer is written upon the upper strip 61 through the opening 70 and transferred to the lower strip 62 by means of the carbon on the under side of the upper strip. As the lever 71 is depressed the pad-press 74 forces the paper strips 61 and 62 down onto the points of the registering figures, and thus effects the proper perforation of the strips. As the lever 71 is raised, under the action of the spring 72 the bars 76 and 87 effect the feeding forward of the strips 61 and 62 and the restoring of the registering mechanism to its normal position, as has been clearly hereinbefore described. The portion of the top strip 61 which has been fed out of the casing is torn off and handed to the buyer, and the under strip being fed around the roller 66 within the casing is to be retained as a duplicate register of the upper strip.

I claim—

1. In an apparatus of the class described, the combination with a supply-tank, of twin measuring vessels, an air-passage between the vessels, a valve disposed at each end of said passage, a valve-chamber disposed between the said vessels, communicating passage-ways between the tank and the vessels and the valve-chamber, a valve disposed within the said chamber, said valve having an upwardly-directed shank, a casing surrounding the valve-chamber, the upper end of the valve-shank protruding above the casing, a handle disposed upon the upper end of the said shank for turning the valve to empty one of the vessels, and fluid-actuated means for engaging and locking the valve when turned by the handle until the vessel is empty when the said fluid-actuated means disengages the valve and permit of a backward turn thereof.

2. In an apparatus of the class described, the combination with a supply-tank, of measuring vessels, an air-passage between the said vessels, valves disposed at each end of the air-passage, a valve-chamber arranged between the vessels, a valve disposed within the chamber, communicating passage-ways between the tank and the vessels and the valve-chamber, a handle for turning the valve to empty one of the vessels, arms pivotally mounted within the communicating passageways of the valve-chamber and the vessels adapted to engage and lock the valve when turned by the handle until the vessel is empty when the said arms disengage the valve and permit of a backward turn thereof.

3. In an apparatus of the class described, the combination with a supply-tank, of twin measuring vessels, an air-passage between the measuring vessels, a valve-chamber communicating with the tank and with the said vessels, a two-way valve disposed within the chamber, said valve having an upwardly-directed shank, a handle mounted upon the shank for turning the valve to empty one of the measuring vessels, and fluid-actuated means for locking the valve when turned by the handle and to release it when said vessel is empty.

4. In an apparatus of the class described, the combination with a supply-tank, of twin measuring vessels, an air-passage between the said vessels, a valve disposed at each end of the air-passage, a valve-chamber disposed between the said vessels, communicating passage-ways between the tank and the vessels and the valve-chamber, a valve disposed within said chamber, said valve having an upwardly-directed shank, a casing surrounding the valve-chamber, the upper end of the shank protruding through the upper face of the casing, a handle disposed upon the upper end of the shank for turning the valve to empty one of the vessels, fluid-actuated means for engaging and locking the valve in its turned position until the vessel is empty when the said fluid-actuated means disengages the valve to permit of a backward movement thereof, and a registering mechanism in communication with and actuated by the said handle.

5. In an apparatus of the class described, the combination with a tank, of measuring vessels, an air-passage between the said vessels, valves disposed at each end of the air-passage, a valve-chamber disposed between the vessels, a valve arranged within the chamber, communicating passage-ways between the tank and the vessels and the valve-chamber, a handle for turning the valve to empty one of the vessels, arms pivotally mounted within the communicating passage-ways of the valve-chamber and the vessels adapted to engage and lock the valve in its turned position and to disengage the valve when the vessel is empty that the valve may turn backward, and a registering mechanism in communication with the handle and actuated thereby.

6. In an apparatus of the class described, the combination with a supply-tank, of twin measuring vessels, an air-passage between the vessels, a valve-chamber communicating with the tank and with the said vessels, a valve disposed within the said valve-chamber, said valve having an upwardly-directed shank, a handle mounted upon the shank for turning the valve to alternately fill and empty the vessels, fluid-actuated means for locking the valve when turned by the handle and to release it when said vessel is empty, and a registering mechanism in communication with and actuated by the turning of the handle.

7. In an apparatus of the class described, the combination with a supply-tank, of twin measuring vessels, an air-passage between the said vessels, a valve, communicating passage-ways between the tank and the vessels and the valve, a handle for turning the valve to empty one of the vessels, and fluid-actuated means arranged and disposed within the passage-ways between the valve and the said vessels to effect the alternate emptying and filling of the vessels, and a registering mechanism in communication with and actuated by the said handle.

In testimony whereof I have signed my name to this specification in the presence of two subscribing witnesses.

JOSEPH G. WILLIAMS.

Witnesses:
W. F. PFAFF,
W. T. MILLER.